United States Patent Office 2,947,742
Patented Aug. 2, 1960

2,947,742

4-AMINO-6-TRIFLUOROMETHYL-N,N'-DI-2-PYRI-DYL-m-BENZENEDISULFONAMIDE

Lee C. Cheney, Fayetteville, and Charles T. Holdrege, Camillus, N.Y., assignors, by mesne assignments, to Bristol-Myers Company, New York, N.Y., a corporation of Delaware No Drawing. Filed June 15, 1959, Ser. No. 820,125

4 Claims. (Cl. 260—239.65)

This invention relates to novel diuretic and natriuretic compounds of therapeutic value and, more particularly, to 4 - amino - 6 - trifluoromethyl - N,N' - di - 2 - pyridyl-m-benzene-disulfonamide and nontoxic metal salts thereof.

In the treatment of many diseases characterized by an excessive accumulation of water in the body, such as the edemas associated with congestive heart failure, toxemia of pregnancy, tension, and in the alleviation of salt retention caused by therapy with certain steroids such as cortisone, the physician requires an agent which will cause the body to excrete water. Previous agents used for this purpose have had many drawbacks. Thus, ammonium salts are not very effective and cause acidosis, xanthine derivatives do not remove water already stored in the body, carbonic anhydrase inhibitors are not very effective and cause undesirable side effects and organic mercurial compounds retain their effectiveness only for limited periods of time, are toxic by nature and must normally be given by injection.

It is the object of the present invention to provide a therapeutic agent of the diuretic type which is highly potent even on prolonged use and does not cause toxic side effects or undesirable metabolic disturbances such as excessive potassium excretion and, preferably, acts by causing the body to excrete roughly equal amounts of sodium and chloride ions.

The object of the present invention has been attained by the provision, according to the present invention, of a member selected by the group consisting of a compound having the formula

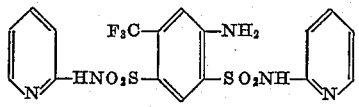

and nontoxic metal salts thereof.

The compounds of the present invention are converted to nontoxic metal salts including calcium, magnesium and aluminum salts and preferably to an alkali metal salt such as sodium or potassium, by treatment with one equivalent of alkali, e.g. one equivalent of aqueous sodium hydroxide. The compounds of the present invention are administered orally in the form of capsules or tablets or, if desired, parenterally as aqueous suspensions or as solutions in dilute aqueous alkali or in nontoxic organic solvents of the hydroxylic type. Dosage is, of course, at the discretion of the physician but representative daily dosages, which may be given in one dose or be divided and given at intervals, fall in the range of 200 mgm. to 3 g. and preferably 500 to 1000 mgm.

The product of the present invention is prepared by the reaction of 4 - amino - 6 - trifluoromethyl-1,3-benzene-disulfonyl chloride with at least two moles of 2-aminopyridine, preferably in a solvent such as tetrachloroethane. Use may be made of a tertiary base such as pyridine or of an excess of 2-aminopyridine as an acceptor for the hydrogen chloride generated. The reaction is carried out between room temperature and about 100° C. and proceeds more rapidly at higher temperatures.

A solution of the starting reagent, 4-amino-6-trifluoromethyl-1,3-benzene disulfonyl chloride, in tetrachloroethane is conveniently obtained by the following procedure:

To a reaction vessel chilled in an ice bath there is added 750 ml. (11.5 mole) chlorosulfonic acid and 1500 ml. tetrachloroethane. m-Aminobenzotrifluoride (130 ml., 161 g., 1.0 mole) is then added slowly with stirring over a fifteen-minute period. The ice bath is removed and 700 g. (12 mole) sodium chloride is added slowly with stirring over a period of 20-30 minutes. The reaction mixture is then stirred and heated slowly to 120° C. (e.g. over one hour), held at 120° C. for about thirty minutes (and if desired held an additional thirty minutes at 120° C.) and then cooled as rapidly as possible to 30° C. or less. The reaction mixture is quenched by pouring rapidly on a stirred mixture of 4.5 l. ice cubes, plus 3 l. cold water with the temperature of the quench mixture being kept below 20° C. The mixture is then stirred for fifteen minutes and filtered. The filtrate (A) is separated and the solvent layer (S-1) and water layer (W-1) are saved. The tarry cake is slurried in 500 ml. tetrachloroethane to remove adhering rich solvent and product. This mixture is then filtered and the solvent phase (S-2) is stirred with previous water phase (W-1). The solvent layer is separated and added to solvent phase (S-1). The combined solvent phases constitute the desired solution in tetrachloroethane of 4-amino-6-trifluoromethyl-1,3-benzenedisulfonyl cyhloride.

Upon intravenous administration in solution at 2% in dilute aqueous sodium hydroxide in dogs at a dosage of 10 mgm. kg., the 4-amino-6-trifluoromethyl-N,N'-di-2-pyridyl-m-benzenedisulfonamide produced an increase of about 200-fold in urinary output of sodium ion as compared to control dogs injected with saline and an increase of seven to ten-fold over that produced by injection of the same dose of the known, highly potent natriuretic agent 6 - trifluoromethyl - 7 - sulfamyl-3,4-dihydro-1,2,4-benzothiadiazine-1,1-dioxide.

One of the most surprising features of the present invention is the finding of potent natriuretic activity for the compound of the present invention in view of the absence of such activity in the closely related compounds having the following formulae:

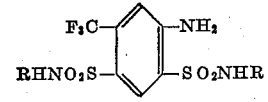

where R is methyl (M.P. 168–170° C.) or ethyl (M.P. 177–181° C.).

The following examples are given to illustrate the scope of this invention without limiting it thereto.

*Example 1*

One liter of tetrachloroethane containing 40 g. (0.112 mole) 4-amino-6-trifluoromethyl-1,3-benzene disulfonyl chloride (which is also called 2,4-disulfonyl-5-trifluoromethylaniline dichloride) was added to 52.5 g. (0.558 mole) 2-aminopyridine and the mixture was allowed to stand overnight at room temperature and then was heated on the steam bath for six hours. A layer of dark-colored oil was present on top of the reaction mixture, which was then extracted with two 250 ml. portions of concentrated NH₄OH. The oil was readily soluble. The aqueous ammoniacal solution was separated and heated four hours on the steam bath to expel ammonia. After chilling in an icebath a viscous oil separated. The aqueous phase was decanted and discarded.

Water (500 ml.) was added to the residue and the mixture was heated to boiling with stirring. The hot aqueous solution was decanted from insoluble material and discarded.

The insoluble material was air-dried and found to weigh 15.6 g., to be insoluble in water, methanol and acetone and to be soluble in pyridine and sodium hydroxide. It was then extracted with 60 ml. boiling pyridine, which was filtered to remove insoluble material which weighed 4.8 g. after drying in air and melted at 288–291° C. on an aluminum block. This material was dissolved at about 100° C. in a minimal amount of dimethylformamide and the solution was filtered, diluted with water, cooled and scratched to precipitate crystalline product, 4 - amino - 6 - trifluoromethyl - N,N'-di-2-pyridyl-m-benzene-disulfonamide, which was collected, found to melt at 293–295° C. (d.) and again recrystallized in the same manner, found to melt at 293–294° C. dec. (Al block) and dried in vacuo at 65° C. over $P_2O_5$ and found to weigh 3.34 g.

*Analysis.*—Calc'd for $C_{17}H_{14}F_3N_5O_4S_2$: C, 43.2; H, 2.98. Found: C, 43.43; H, 3.22.

*Example 2*

To 2-aminopyridine (282 g., 3 mole) and 1 l. pyridine placed in a 12 l. flask a solution (3.8 l.) of tetrachloroethane containing 302 g. (0.849 mole) of 4-amino-6-trifluoromethyl-1,3-benzenedisulfonyl chloride was added in portions over a period of 20 minutes to give a moderately exothermic reaction. The maximum temperature was 60° C. The mixture was stirred six hours without heating or cooling and was then at 30° C. After standing overnight at room temperature, the mixture was heated at 65–78° C. for seven hours, cooled to room temperature and washed with stirring with 4 l. and then 3 l. water. The aqueous phase was removed by siphoning. A quantity of gummy dark brown solid floating on top of the tetrachloroethane was separated by siphoning off the tetrachloroethane, stirred 15 minutes in one liter methanol, collected by filtration, washed on the filter with 5 portions of methanol and found to melt at about 260–265° C. and to weigh 163 g. This product was dissolved by heating to boiling in 700 ml. dimethylformamide. The solution was filtered hot to remove some insoluble material, designated solids A. The filtrate was diluted with 400 ml. water, scratched and cooled to precipitate 75 g. crystalline 4-amino-6-trifluoromethyl-N,N'-di-2-pyridyl-m-benzenedisulfonamide, M.P. 289–293° C. This product was recrystallized by dissolving in 500 ml. boiling dimethylformamide, treating with carbon, filtering, adding the 100 ml. dimethylformamide used to wash the carbon on the filter and diluting with 350 ml. water to precipitate crystalline product which was collected, washed with methanol, dried and found to weigh 61 g. and to melt at 290–292° C. (dec.). This lot weighed 60.8 g. after drying in vacuo over $P_2O_5$.

An additional amount of product was obtained from the above-mentioned "solids A" by dissolving it in 500 ml. boiling dimethylformamide, filtering, diluting with 300 ml. water, cooling and scratching to precipitate crystalline product which was collected by filtration, washed with methanol, sucked dry and found to weigh 34.6 g. and to melt at 293–294° C. (dec.). This lot weighed 29.3 g. after drying in vacuo over $P_2O_5$.

The melting points given above were taken in a capillary in an aluminum block.

We claim:

1. A compound selected from the group consisting of 4 - amino - 6 - trifluoromethyl - N,N' - di - 2 - pyridyl-m-benzenedisulfonamide and nontoxic metal salts thereof.

2. 4 - amino - 6 - trifluoromethyl - N,N' - di - 2 - pyridyl-m-benzenedisulfonamide.

3. An alkali metal salt of 4-amino-6-trifluoromethyl-N,N'-di-2-pyridyl-m-benzenedisulfonamide.

4. A sodium salt of 4-amino-6-trifluoromethyl-N,N'-di-2-pyridyl-m-benzenedisulfonamide.

References Cited in the file of this patent

UNITED STATES PATENTS 2,910,475    Novello  ---------------- Oct. 27, 1959

OTHER REFERENCES

Kulka: Can. J. Chem., vol. 32, pp. 598–605 (1954).